(12) United States Patent
Partos

(10) Patent No.: US 9,998,510 B2
(45) Date of Patent: Jun. 12, 2018

(54) VIDEO-BASED SOCIAL INTERACTION SYSTEM

(71) Applicant: Walter Partos, Santa Monica, CA (US)

(72) Inventor: Walter Partos, Santa Monica, CA (US)

(73) Assignee: Walter Partos, Santa Monica, CA (US)

( * ) Notice: Subject to any disclaimer, the term of this patent is extended or adjusted under 35 U.S.C. 154(b) by 176 days.

(21) Appl. No.: 14/822,775

(22) Filed: Aug. 10, 2015

(65) Prior Publication Data

US 2016/0274737 A1 Sep. 22, 2016

Related U.S. Application Data

(60) Provisional application No. 62/136,392, filed on Mar. 20, 2015.

(51) Int. Cl.
```
G06F 3/048      (2013.01)
H04L 29/06      (2006.01)
G06F 21/31      (2013.01)
G06F 21/36      (2013.01)
```

(52) U.S. Cl.
CPC .......... *H04L 65/403* (2013.01); *G06F 21/316* (2013.01); *G06F 21/36* (2013.01)

(58) Field of Classification Search
CPC ........... H04N 21/4788; H04N 21/2187; H04N 21/4223; H04N 7/15; H04N 21/25875
See application file for complete search history.

(56) References Cited

U.S. PATENT DOCUMENTS

| | | |
|---|---|---|
| 8,813,149 B2 | 8/2014 | Marignan et al. |
| 9,597,586 B1 * | 3/2017 | Wiklem ................. A63F 13/12 |
| 2014/0323167 A1 | 10/2014 | Spearritt et al. |
| 2014/0365349 A1 * | 12/2014 | Kennon ................. G06Q 50/01 705/34 |
| 2015/0006414 A1 | 1/2015 | Janapareddy et al. |

FOREIGN PATENT DOCUMENTS

| | | |
|---|---|---|
| EP | 2 663 084 A1 | 11/2013 |
| WO | WO 2012/158807 A2 | 11/2012 |
| WO | WO 2013/181644 A1 | 12/2013 |
| WO | WO 2014/197718 A2 | 12/2013 |
| WO | WO 2014/197718 A2 | 12/2014 |

OTHER PUBLICATIONS

International Searching Authority, "Search Report" in application No. PCT/US16/19081, dated May 5, 2016, 11 pages.
Current Claims in application No. PCT/US16/19081, dated May 2016, 3 pages.
European Patent Office, "Search Report" in application No. 16769248.2-1218, dated Feb. 16, 2018, 8 pages.
European Claims in application No. 16769248.2-1218, dated Feb. 2018, 5 pages.

* cited by examiner

*Primary Examiner* — Namitha Pillai
(74) *Attorney, Agent, or Firm* — Hickman Palermo Becker Bingham LLP

(57) ABSTRACT

Techniques are described herein for preventing users from lying in a social interaction system by requiring every social interaction to be mediated through software that directly accesses hardware and software components in a user's electronic device. By requiring that every interaction to be through the social interaction system (i.e. the social interaction system has direct access to the hardware components) the users using the social interaction system are more likely to become aware of the other users actual identity before meeting them in person.

20 Claims, 18 Drawing Sheets

VIDEO-BASED SOCIAL INTERACTION SYSTEM

CROSS-REFERENCE TO RELATED APPLICATIONS; BENEFIT CLAIM

This application claims the benefit of Provisional Appln. 62/136,392, filed Mar. 20, 2015, the entire contents of which is hereby incorporated by reference as if fully set forth herein, under 35 U.S.C. § 119(e).

FIELD OF THE INVENTION

The present invention relates to social messaging and networking techniques, and more specifically to improved computer-implemented techniques for authenticating virtual identities over one or more computing devices.

BACKGROUND

As used herein, the term "social interaction system" refers to any system in which users are able to electronically communicate with other users over a digital network. Social interaction systems include, for example, messaging applications, social networking websites, collaboration systems, dating websites, etc. In typical social interaction systems, each user has a virtual identity that is associated with certain information about the user. Depending on the nature of the social interaction system, that information may include, for example, a picture and name to represent the user as well as personal information such as likes and dislikes, geographic location, education, employment, contact information, and additional content chronicling the user's past. This information may be further categorized into preferences towards music, movies, television shows, hobbies, activities, and other preferences. Various social interaction systems use all or subsets of the personal information to facilitate users to interact with one another.

Typically, a virtual identity is created by a user at the time of account creation when the user responds to a series of prompts and questions. These prompts and questions are directed toward the user's actual identity, so the virtual identity will be a reflection of the actual identity. Additional media may be uploaded by a user to authenticate the connection between a user's virtual identity and the user's actual identity.

Unfortunately, when constructing a virtual identity, users are biased and may choose or supply information that does not accurately reflect their actual identity. Examples include uploading photos from when the user was younger, answering questions based on an ideal self-perception rather than objectively, basing a virtual identity on another's actual identity, having another person provide articulate responses based on the primary user's actual responses, hiding behind humor, providing objectively false information, and creating a virtual identity based on a fictional character.

The usefulness of a social interaction system may be significantly reduced by inaccuracies in the information associated with the virtual identities of its users. Further, even when accurate, non-video information associated with a virtual identity does not convey the personality of the user nearly as well as video information, due in part to the enormous amount of information conveyed by non-verbal facial expressions and gestures. Therefore, it is highly desirable to provide techniques for facilitating video-based interactions in a manner that reduces the likelihood of inaccurate or misleading information exchanges.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for preventing users from providing deceptive or misleading video-based information in a social interaction system by requiring video-based communications to be mediated through software that directly accesses hardware and software components in a user's electronic device. By requiring that video-based communications be captured and exchanged exclusively through use of software provided by the social interaction system itself, the users using the social interaction system can have greater confidence that the video-based content reflects the current personality and appearance of the users with whom they are interacting. In particular, users can have increased confidence that they will not be misled by video files created, altered, or manipulated by other programs, or by previously-created video content that does not reflect current conditions.

Techniques are also described herein for requiring video-based communication among users to be through the transfer of videos created using the software of the social interaction system. Viewing a user through a video provides a user with visual cues including body language, speech, and visual appearance that may allow a user to determine attraction to that particular user. Because the video interactions are through video created by the social interaction system, the primary user may pick up on more visual cues than a simple picture or descriptive text would allow.

System Overview

Figure 1A:
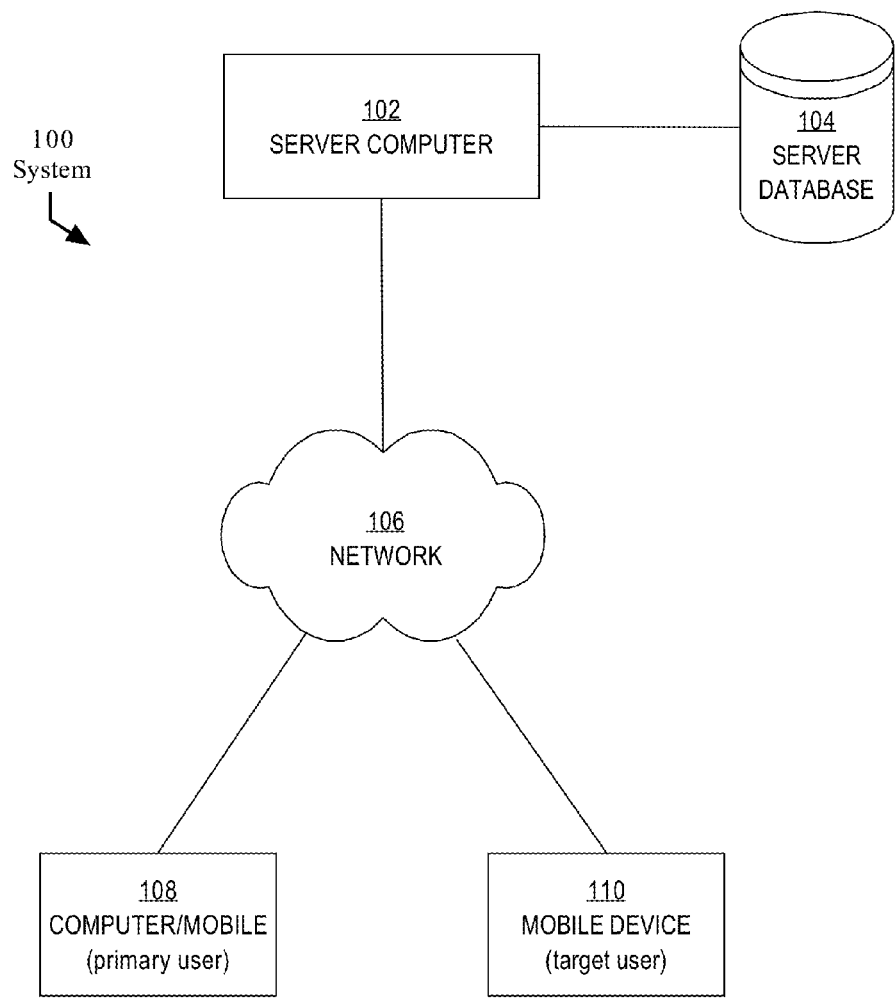
FIG. 1A is a block diagram illustrating an example of a social interaction system architecture.

Referring to FIG. 1A, the social interaction system 100 has two electronic devices 108, 110 connected to a central server 102. These electronic devices 108, 110 have one or more processors and local memory. In addition, each electronic device is respectively executing a social interaction program.

The server computer executes commands that are submitted through the social interaction programs by the electronic devices. The data used by those programs is primarily in the server database 104.

For the purpose of illustration, the server database 104 is shown as stored on a single device, but in alternative embodiments, the database may be spread across multiple devices to which each of the electronic devices have access.

Creating a Virtual Identity Exclusively Through the Social Interaction System

Figure 1B:
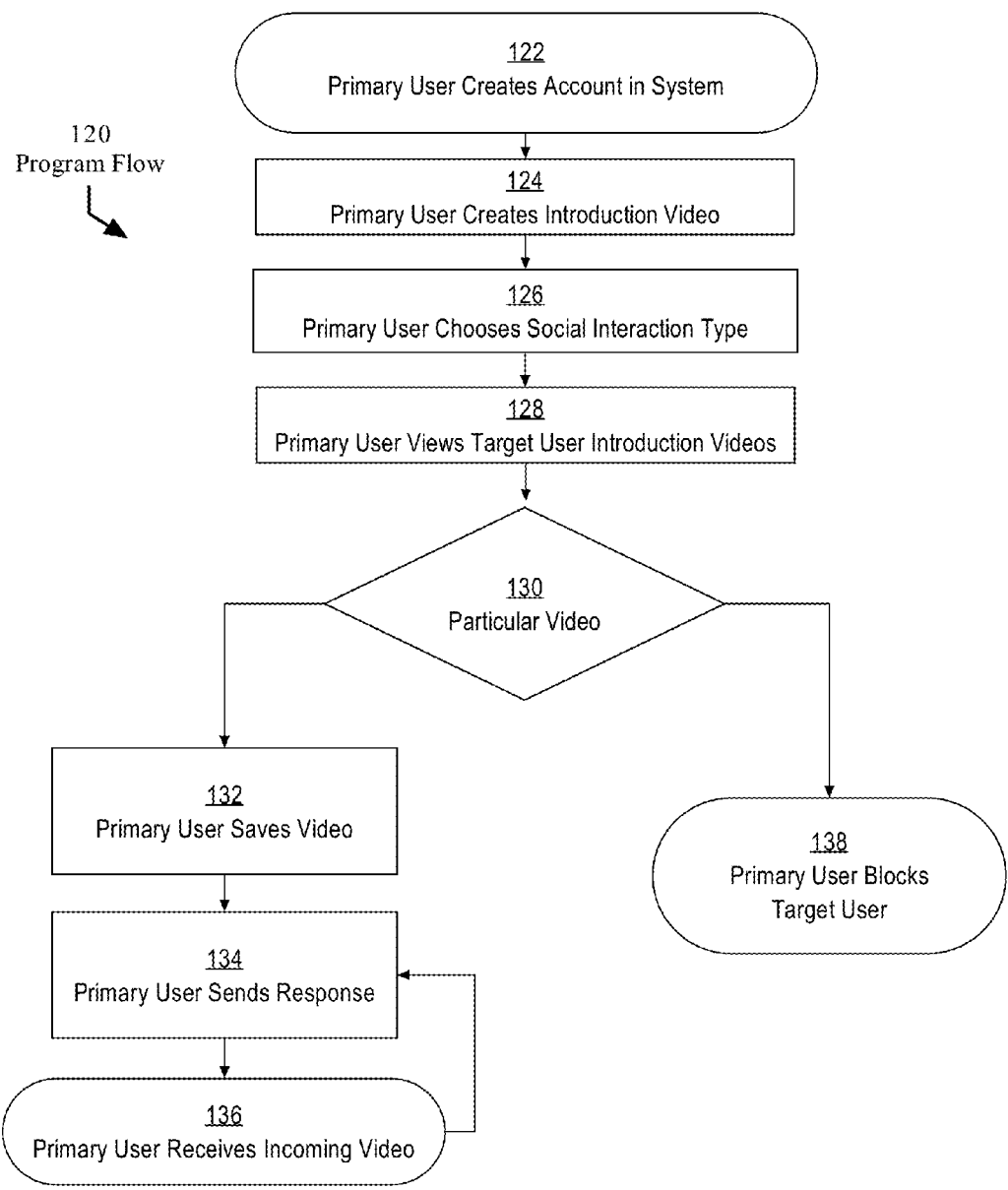
FIG. 1B is a block diagram illustrating an example flowchart of a user experience.

According to one embodiment, a virtual identity for a primary user is created by recording an introduction video with software and hardware components accessed exclusively by social interaction software. The primary user may then interact with target users by viewing their introduction videos and responding to them with a user-to-user response video or blocking them. FIG. 1B is a block diagram illustrating an example flowchart of a user experience for a primary user. At step 122, the primary user creates an account in the system. Then at step 124, the primary user creates an introduction video and/or selects a social interaction type for primary user. After the introduction video is created, at step 126 the primary user may choose to view other target users by choosing a social interaction type (based on sexual preference or for simply "hanging out" with another user). A subset of all introduction videos are displayed to the user based on the social interaction type chosen, so the primary user may view target user videos at step 128. The social interaction type for the primary user may correspond to the social interaction type selected by the other target users. Based on any particular video, at step 130, the primary user has a choice of responding to the video or blocking the user 138. Under the first choice, the primary user may first save the video at step 132 or jump directly to sending a response video at step 134. After sending the response video, the primary user may receive an incoming message from the target user at step 136. The incoming message is a second response video created by the target user using the social interaction system. In different embodiments, one or more of these steps may be used in a different order or removed all together.

In order to create videos, the social interaction software has direct access to hardware components of the user's electronic device. Example electronic devices, include, but are not limited to mobile devices and personal computers. For example, FIG. 1E illustrates an example screenshot of a social interaction system requesting access to a (video) camera 162 coupled to a user's electronic device. The request may be for a specific camera on an electronic device such as a cell phone's front facing camera. The request may also be for access an external camera that is currently connected to the electronic device through a hardwired or wireless interface.

Figure 1C:
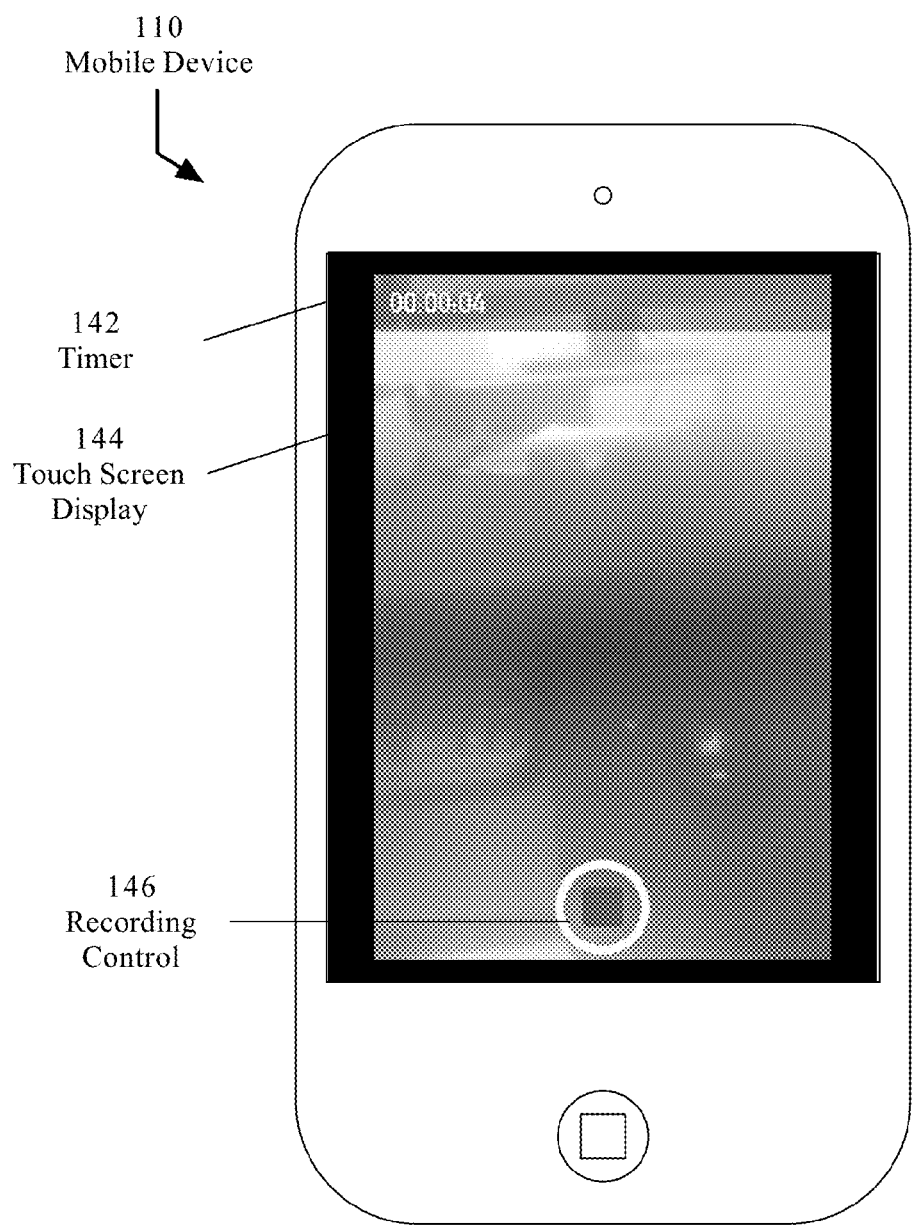
FIG. 1C is an example screenshot of natively creating an introduction video with the social interaction system.
Figure 1D:
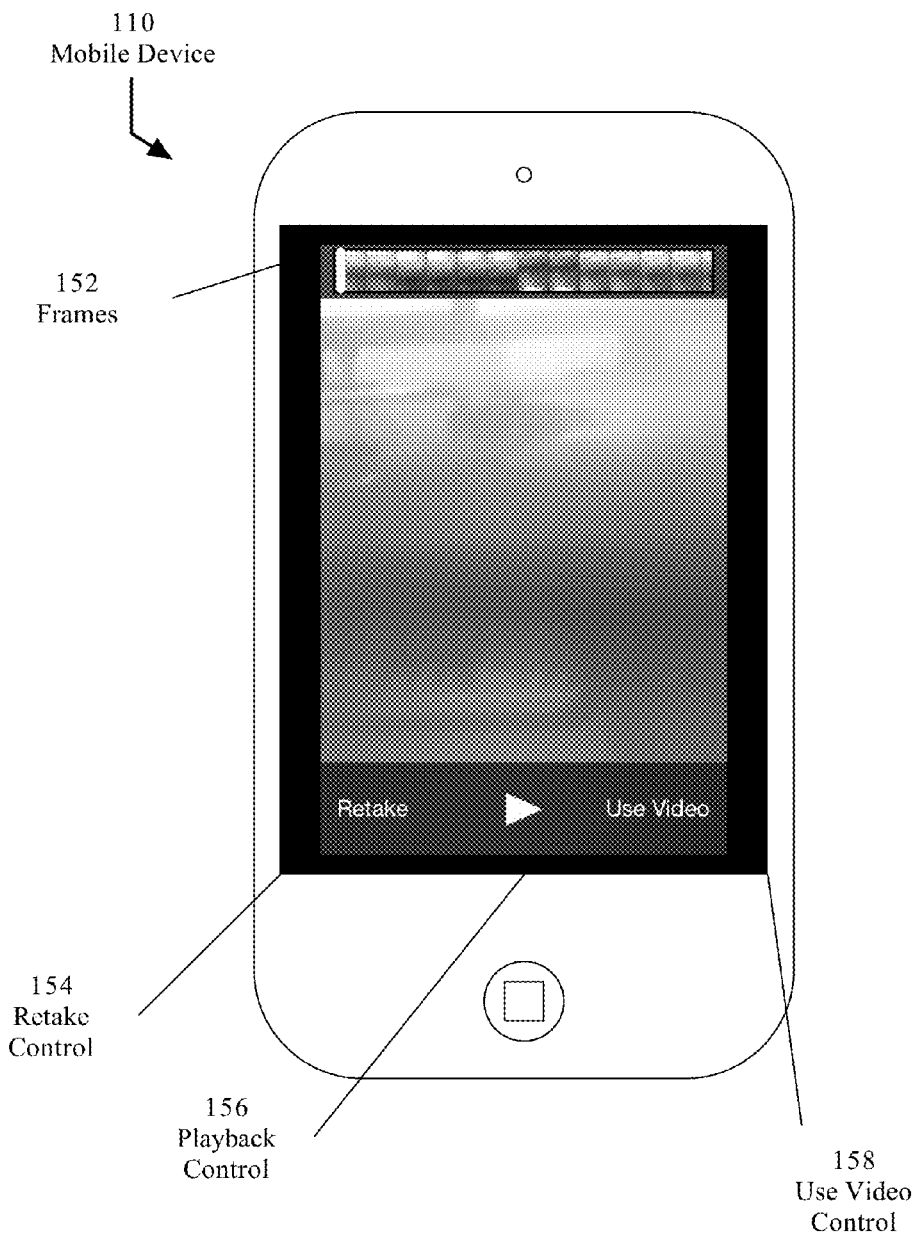
FIG. 1D is an example screenshot for accepting a natively created introduction video with the social interaction system.
Figure 1E:
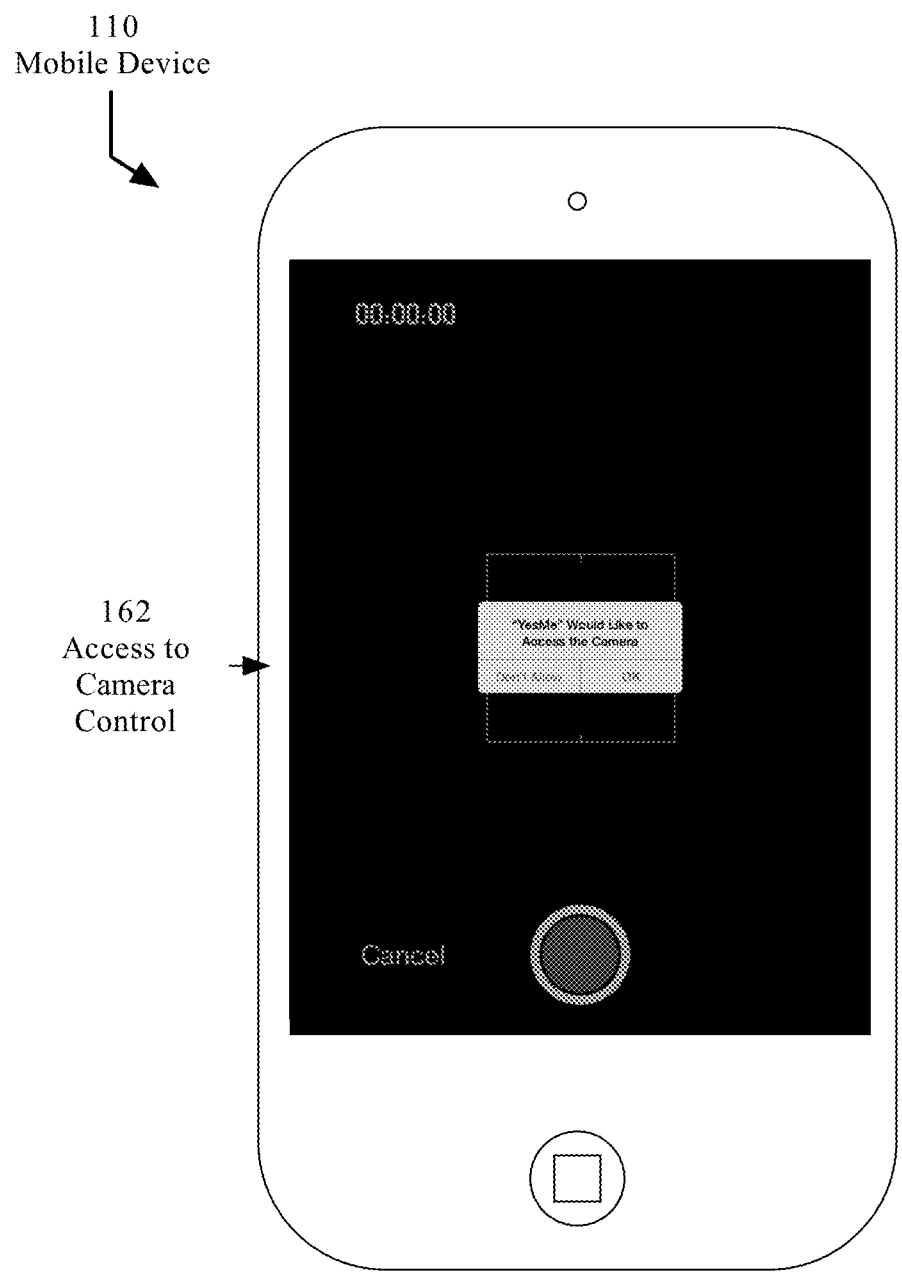
FIGS. 1E and 1F are example screenshots of the social interaction system software directly accessing hardware components of an electronic device.
Figure 1F:
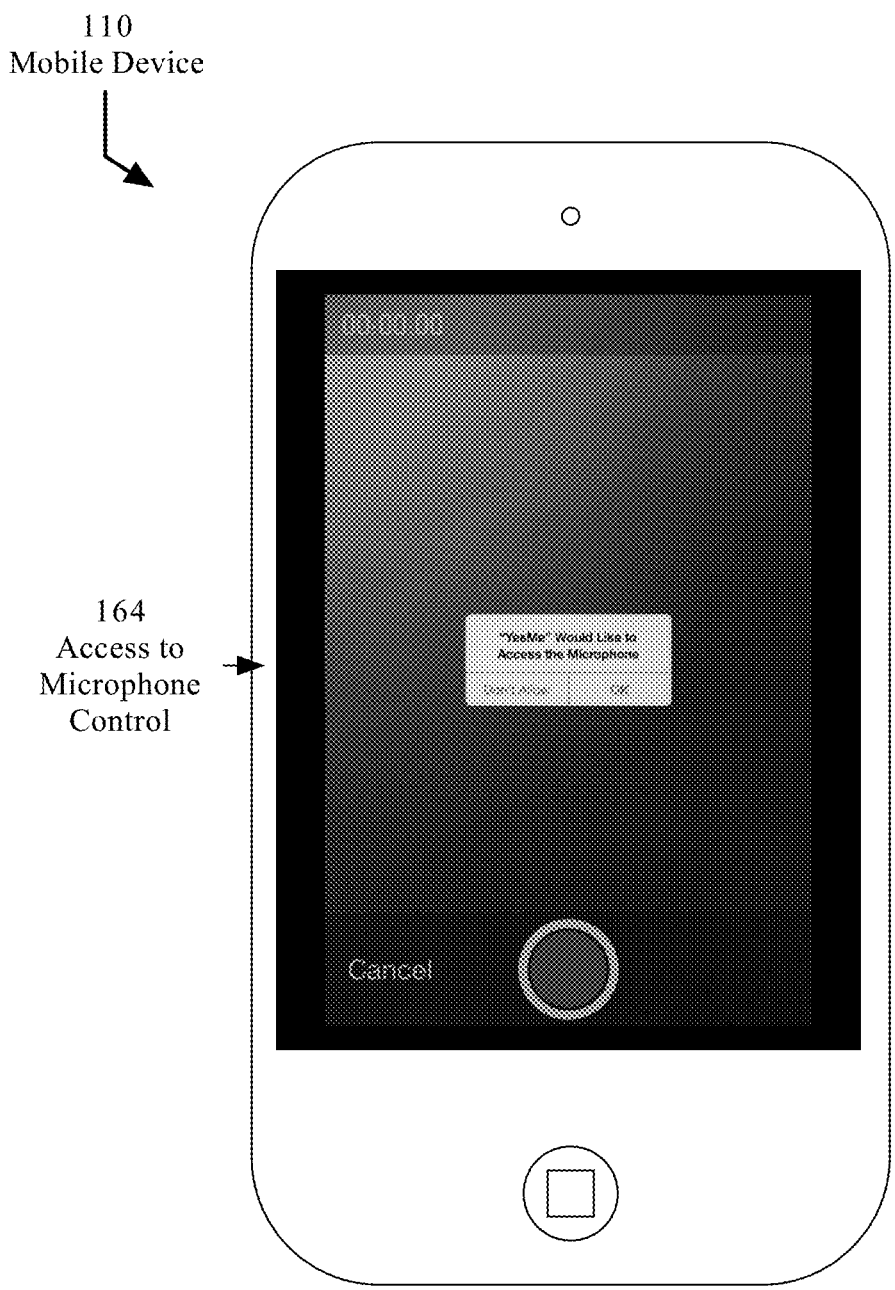

Similarly, FIG. 1F illustrates an example screenshot of a social interaction system requesting access to a microphone 164 coupled to a user's electronic device. This request may be combined or separate from the request to access the camera coupled to the user's electronic device. Furthermore, this request may be access for a specific microphone on an electronic device or for access to an external microphone connected to the electronic device through a hardwired or wireless interface.

Media May not be Uploaded from Other Applications

To help ensure that media provided by the primary user is accurate, the social interaction system prevents content from being uploaded that was created by other software or applications. For example, a user may not take a picture with the user's smartphone using a third party photograph application and then upload that picture to the social interaction system. Preventing content from being uploaded may be done passively by simply not providing an input field for such content. Additionally, all content or a portion of the content created by the social interaction system may be secured using one or more encryption mechanisms and/or proprietary file types. Encoding a live video recording in a proprietary file type may include adding metadata such as the date and time the file was created or encoded or account information used to create or encode the live video recording. Decrypting information requires using the social interaction software, and possibly authentication techniques known in the art.

For example, a decryption step may include the electronic device checking each video file to ensure that the file is encrypted and/or encoded before uploading to the server computer. Alternatively, the server computer may check a received video file to ensure that the file is encrypted and/or encoded before downloading the filed. The encryption may be used to show that the video was encrypted by the social interaction software.

To further ensure that the introduction media provided by the primary user is accurate, the social interaction system may limit the user to specific forms of media for introduction content such as video. While pictures, sound files, and text can be manipulated using external sources, videos provide many more visual or audible cues that ensure the authenticity of the person being filmed. For example, a picture or voice recording may be re-recorded using the camera or microphone secured by the social interaction system. However, re-recording a video in this manner is easily detected. Such attempts to fool a primary user may be prevented automatically through a video integrity filter that scans for images that could be videos of videos. A primary user may also catch the difference naturally based on quality of the video compared to other videos. Additionally, a friend of the primary user may be willing to pose for a picture, but the friend is less likely to be willing to fabricate an entire video for the primary user. Furthermore, the social interaction system consistently requires video recording for future interactions, so using a friend as a recurring actor would require a fair amount of dedication.

FIG. 1C is an example screenshot of creating an introduction video with the social interaction system. The touch screen 144 interface provides a timer 142 for recording the length of the video. According to one embodiment, the video may be limited to a certain amount of time. There are also options 146 to pause the recording and restart the recording. After recording the video, the primary user is given the option to send the recorded video or save it for later.

FIG. 1D is an example screenshot for accepting a natively created introduction video with the social interaction system. After a user stops recording, the frames 152 of the video are across the top of the screen. A user is given the option to retake 154, play the video back 156, or use the video 158.

Although most embodiments have all content created through video recordings, some forms of content may be input as text. For example, a username may be provided through standard text input. This input is less likely to cause another user to be misled regarding the primary users actual identity.

Introduction Videos

A primary user or target user is initially prompted to connect with other users by creating a short video referred to herein as an "introduction video." Introduction videos are the first videos that a primary user sees when viewing potential candidates for dating or hanging out. They are meant to start a conversation between users.

In some embodiments, the social interaction system prompts the primary user to select the type of social interaction that they seek. The user interface for this prompt may include links to meeting other users based on sexual preference. The user interface for this prompt may also contain specific types of events or meet ups. Thus, the user interface may provide an option to select introduction videos for meeting other users for couple or group activities that include networking, going to specific events such as concerts, exercising, fine dining, activities, wine tasting, leisure activities, shopping, walking tours, and additional activities that are enjoyable with more than one person. When creating introduction videos, a primary user could make multiple videos and associate each video with a different social interaction/activity or sexual preference.

Figure 2A:
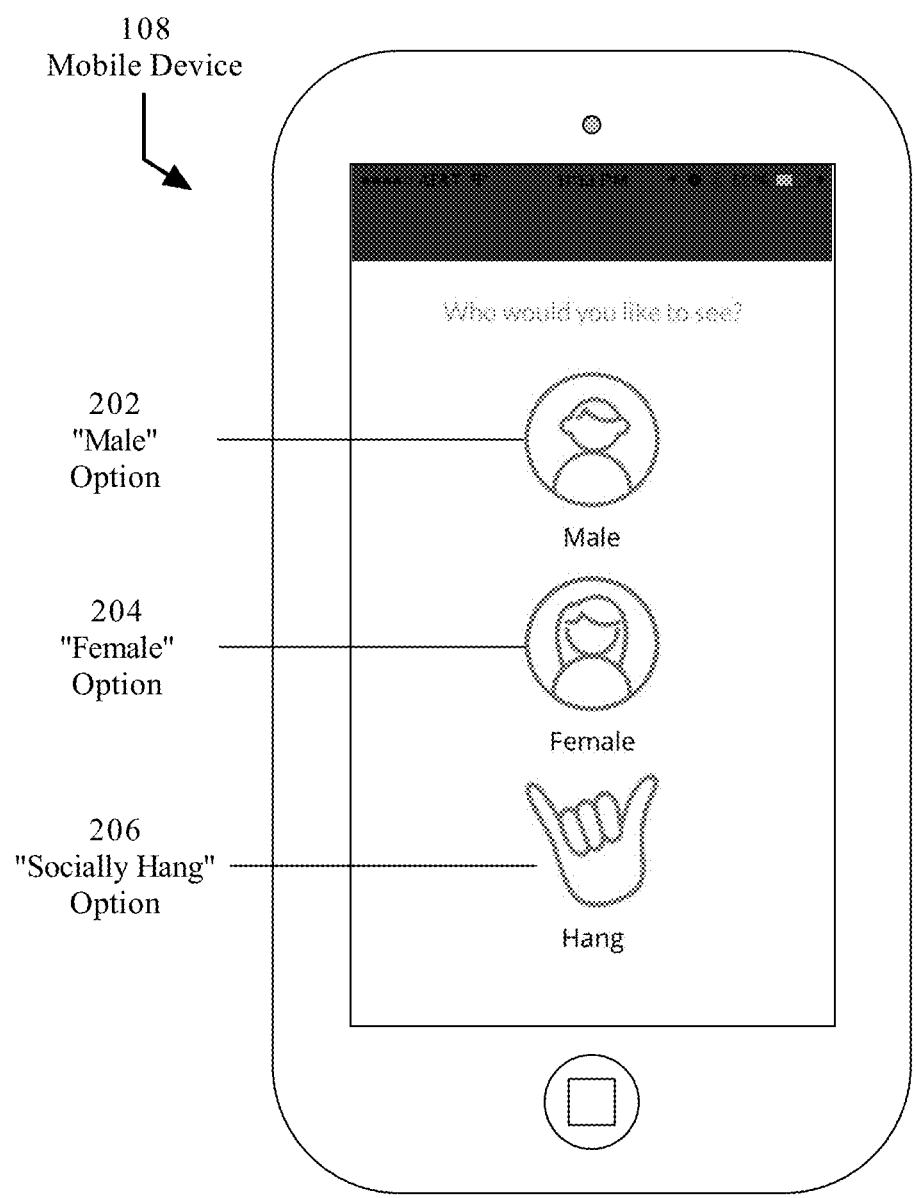
FIG. 2A is an example user interface for viewing introduction videos of other users based on sexual preference or for a specific hangout.

FIG. 2A is an example user interface for viewing introduction videos of other users based on sexual preference and an option to "hang" 206 socially. The first two options ("male" 202 and "female" 204) may be used for meeting someone for dating purposes, while the third option may simply be used for inviting people to specific events. Note the hang out option is typically used to view videos of any sex.

Optionally, viewing videos of other users may be limited to once or a specific limited number of times per day, per week, per month, or per account. Depending on the embodiment, limiting use to a number of times may include limiting the function of viewing any video, limiting the function of viewing a specific video, limiting the function of viewing and responding to a specific video, or any combination of the above limitations. Limitations may be enforced by removing one or more specific controls, buttons, or menus corresponding to the limitation or by creating a visual indication that specific controls, buttons, or menus are unavailable.

Transitioning Through Videos

After choosing a category of introduction videos to view, a user may view a plurality of videos. These videos may be initially presented in a list such as a group of search query results with thumbnails of each video. The introduction videos may be presented in a slide show reel, giving the primary user the ability to flip through thumbnails. The introduction videos may be placed in a mosaic with some video thumbnails presented larger than others. The introduction video thumbnails may also be presented in a traditional grid format, organized by row and column. Additionally, video thumbnails do not need to be presented to the primary user. Instead, the first video may start as soon as the primary user chooses a category.

The order of introduction videos may be based on one or more factors. For example, introduction videos may be presented to the primary user according to the user's geographic location or region. This location or region may be determined based on a GPS in the primary user's device and/or in one or more devices used by one or more target users. In some embodiments, this location may be chosen by the primary user. Target users that are closest to the user may be viewed first. Alternatively, all videos within a specific region may be randomly ordered. Additional algorithms may be used to present videos in a random or factor based fashion.

Transitioning through videos may include swiping from one video to the next in one direction and then swiping to the previous video in another direction. Swiping in a specific direction may also be reserved for specific events such as saving a video for later viewing or choosing to respond to a video. Transitioning to another video may also include other forms of input such as pressing a button, tapping a touch screen once or twice, shaking an electronic device that has a built in accelerometer, magnetometer, or gyroscope to detect the shake, flipping, turning, or spinning the electronic device in a general manner or around a specific axis, pressing a button (touch screen or hardware) to return to a previous menu and then choosing another video, letting a first video finish and then automatically playing the next video, multi-touch inputs, or some other form or combination of actions that trigger a transition between videos.

Additional actions may be tracked via the electronic device's touch screen, camera, microphone, or other input devices to transition from video to video, control the playback of a video by jumping to specific locations or jumping ahead or behind incremental amounts of time, zooming in and out, controlling volume, and controlling additional screen and video settings.

User Interface Features in Each Video

Figure 2B:
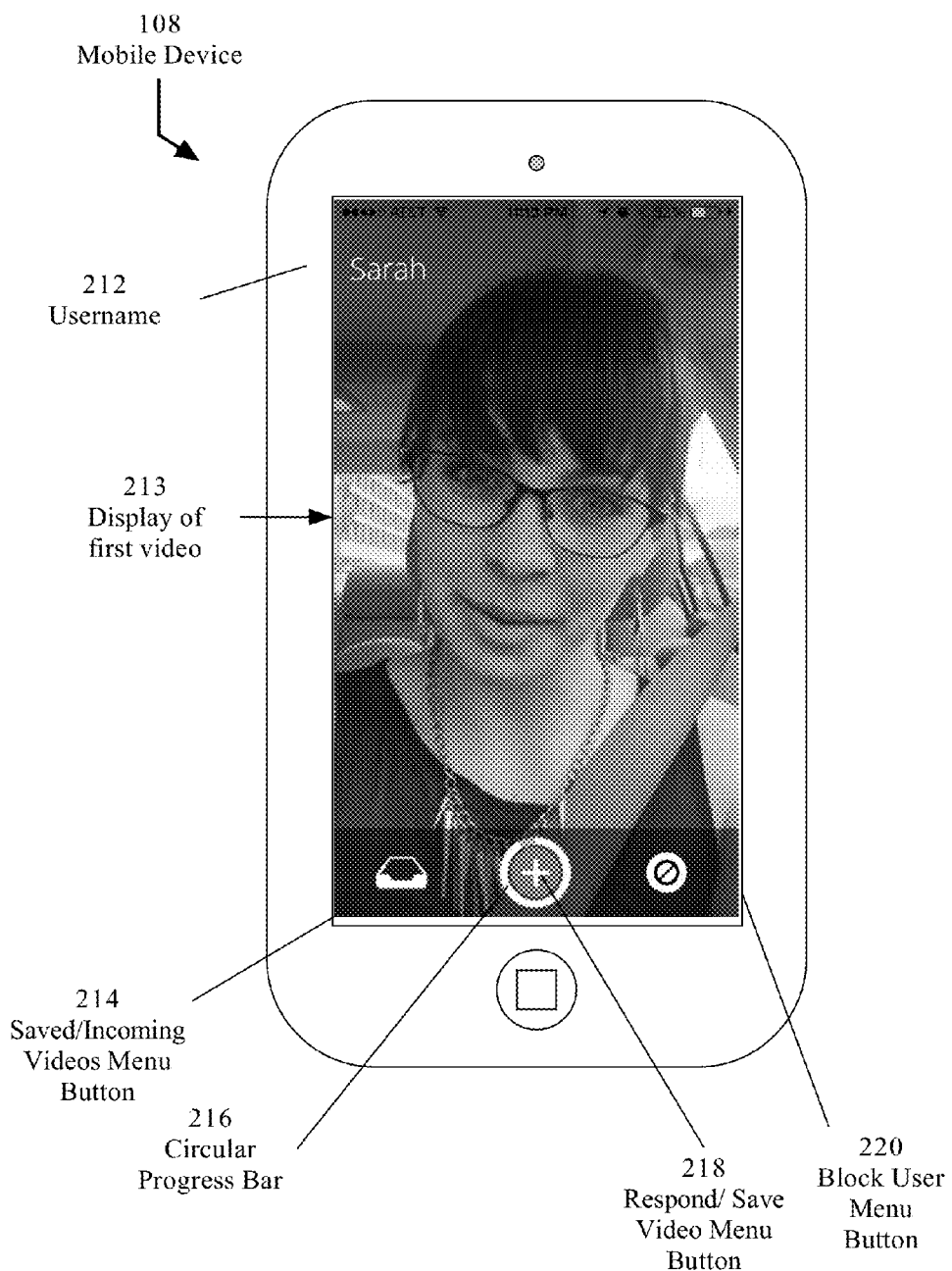
FIG. 2B is an example user interface for viewing an introduction video from a first user.
Figure 2C:
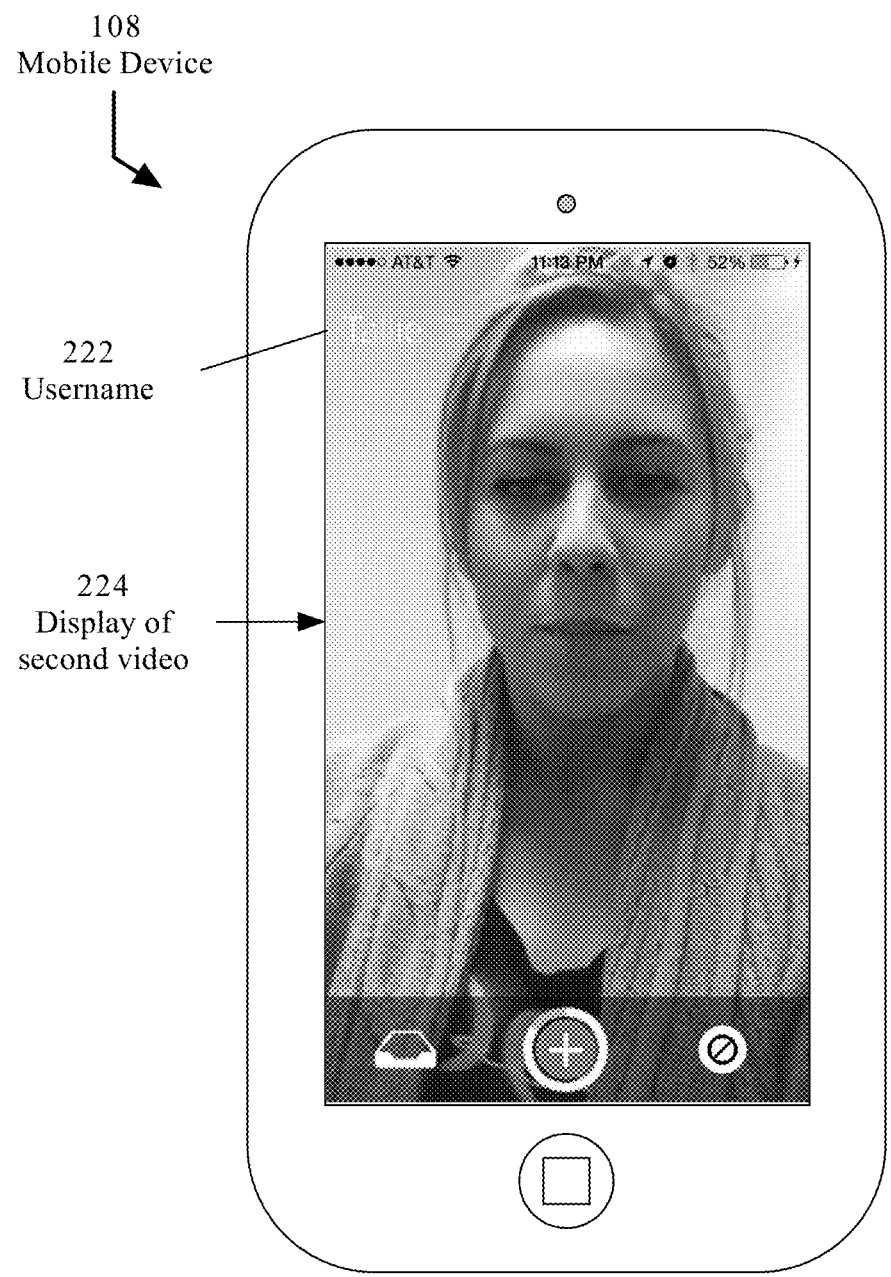
FIG. 2C is an example user interface for viewing an introduction video from a second user.

FIGS. 2B and 2C are a screenshots of a user interface displaying videos 213, 224 of introduction videos by different target users to encourage further social interaction with those users. The example screenshots depict five features, including, 1) a user name 212, 222 in the top left corner; 2) a button 214 in the bottom left corner to display a menu of incoming videos and saved videos; 3) a circular progress bar 216 counting down the length of the video; 4) a button 218 in the bottom center to respond to or save the current video; 5) a button 220 at the bottom right to display a menu for blocking the target user.

Figure 2D:
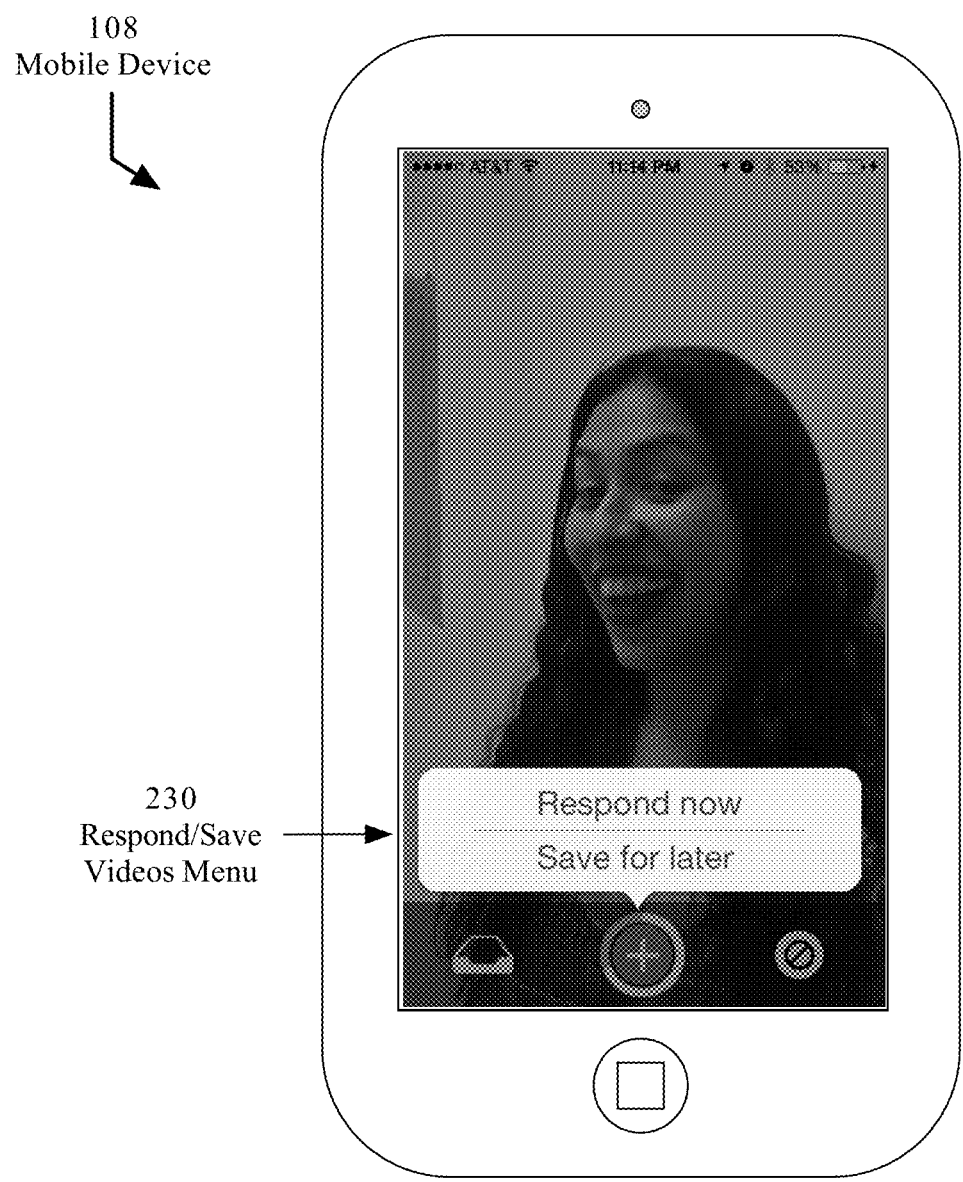
FIG. 2D is an example user interface for saving an introduction video from a second user for later viewing.
Figure 3A:
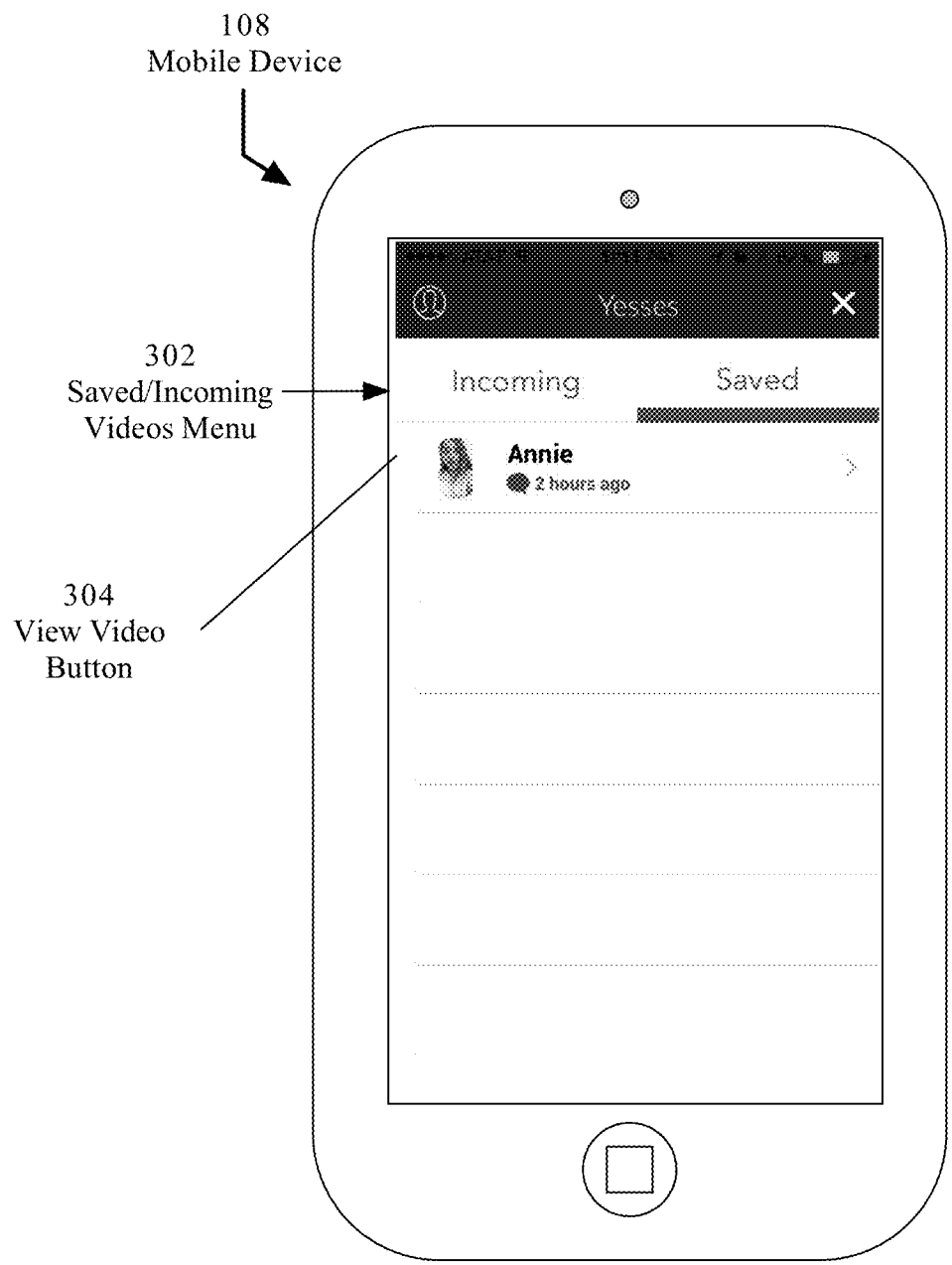
FIG. 3A is an example interface for viewing or re-viewing a video from a particular target user.
Figure 3B:
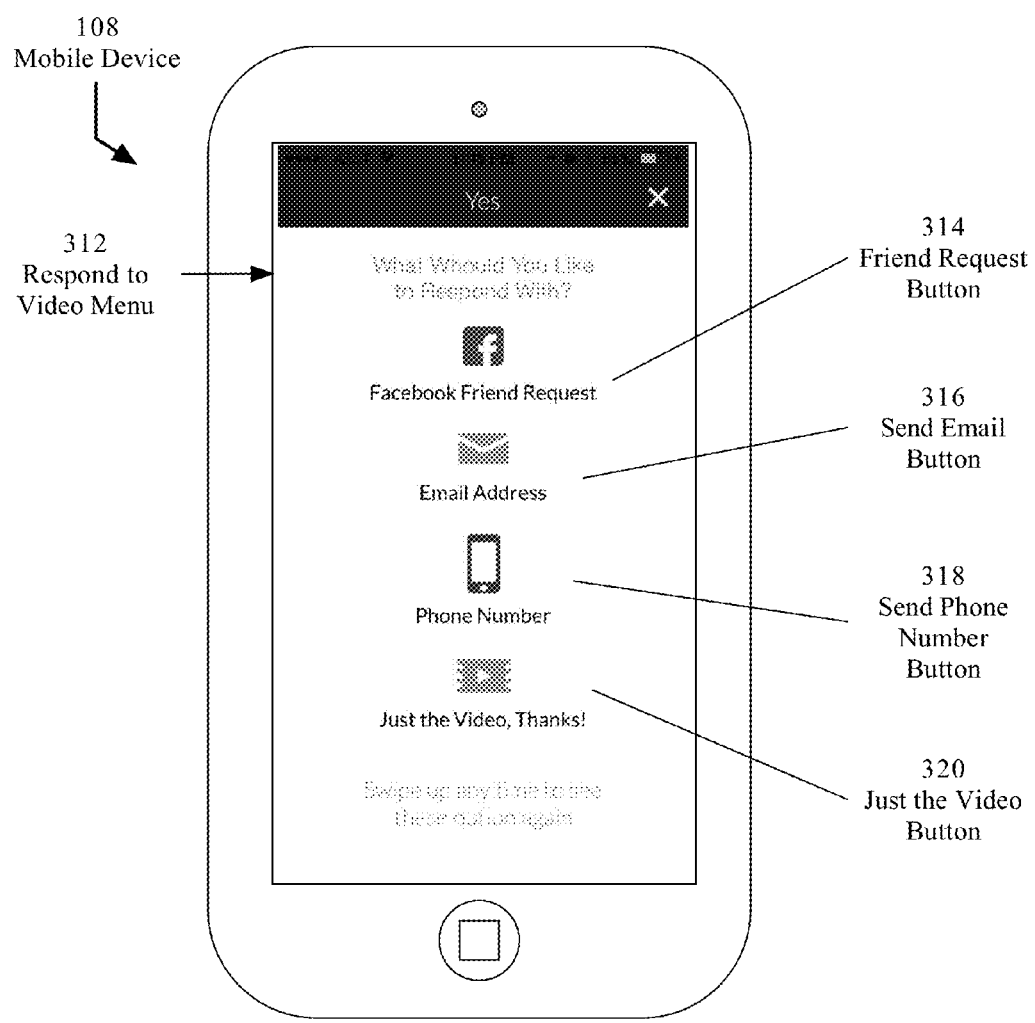
FIG. 3B is an example of choosing how to respond to a particular user based on their introduction video.
Figure 3C:
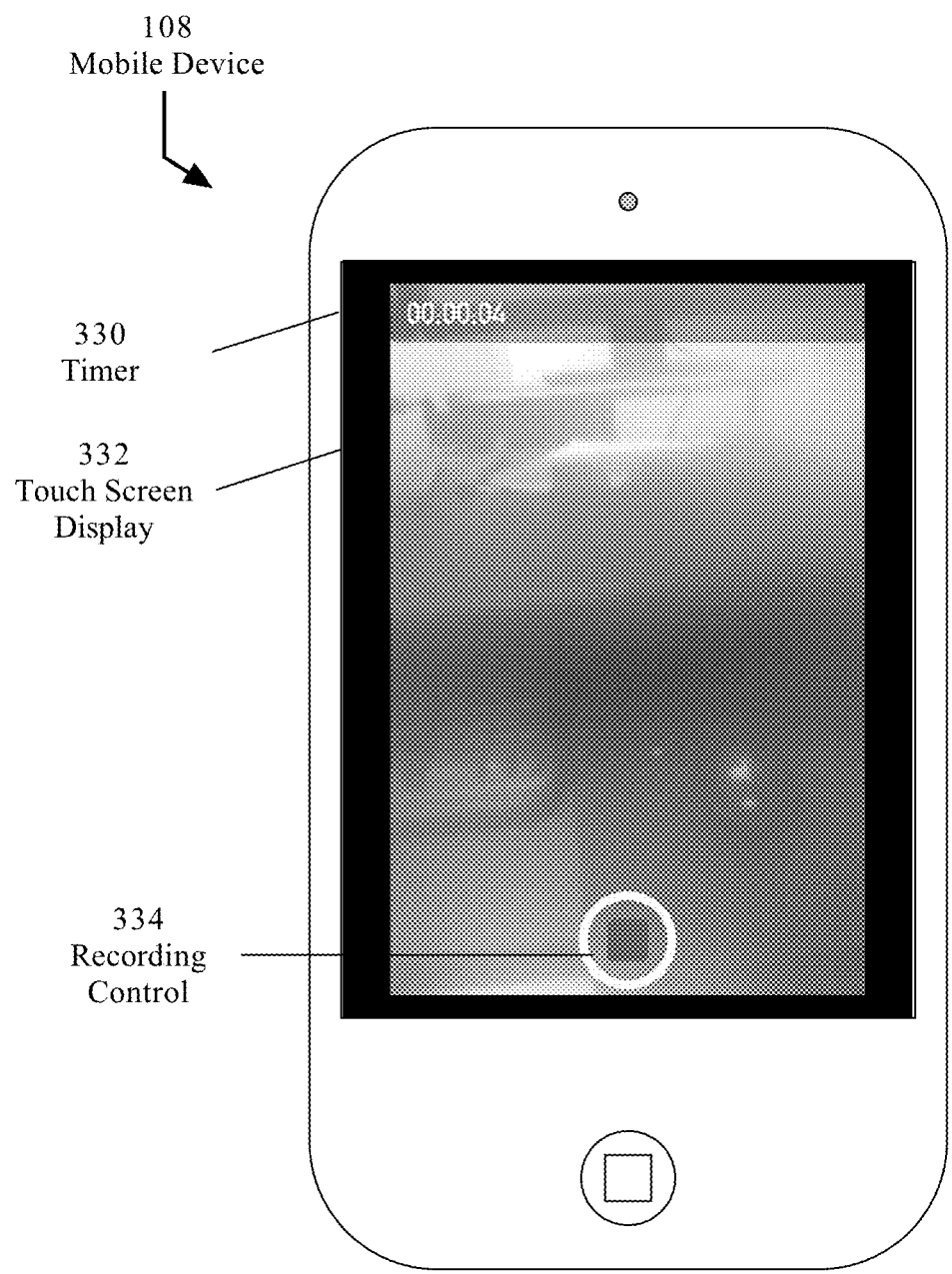
FIG. 3C is an example of the social interaction system being used to respond to a particular user based on their introduction video.

FIG. 2D is an example screenshot after the primary user has pressed the bottom center button. In menu 230, the primary user may respond immediately or save the video for later viewing. FIGS. 3A-3C are different embodiments of screens of what is displayed to a primary user after the primary user has selected the "respond now" option. In a preferred embodiment, the display is FIG. 3B, so the primary user may choose to respond with a Facebook Friend Request, an email, a phone number, or their own video response message.

Figure 2E:
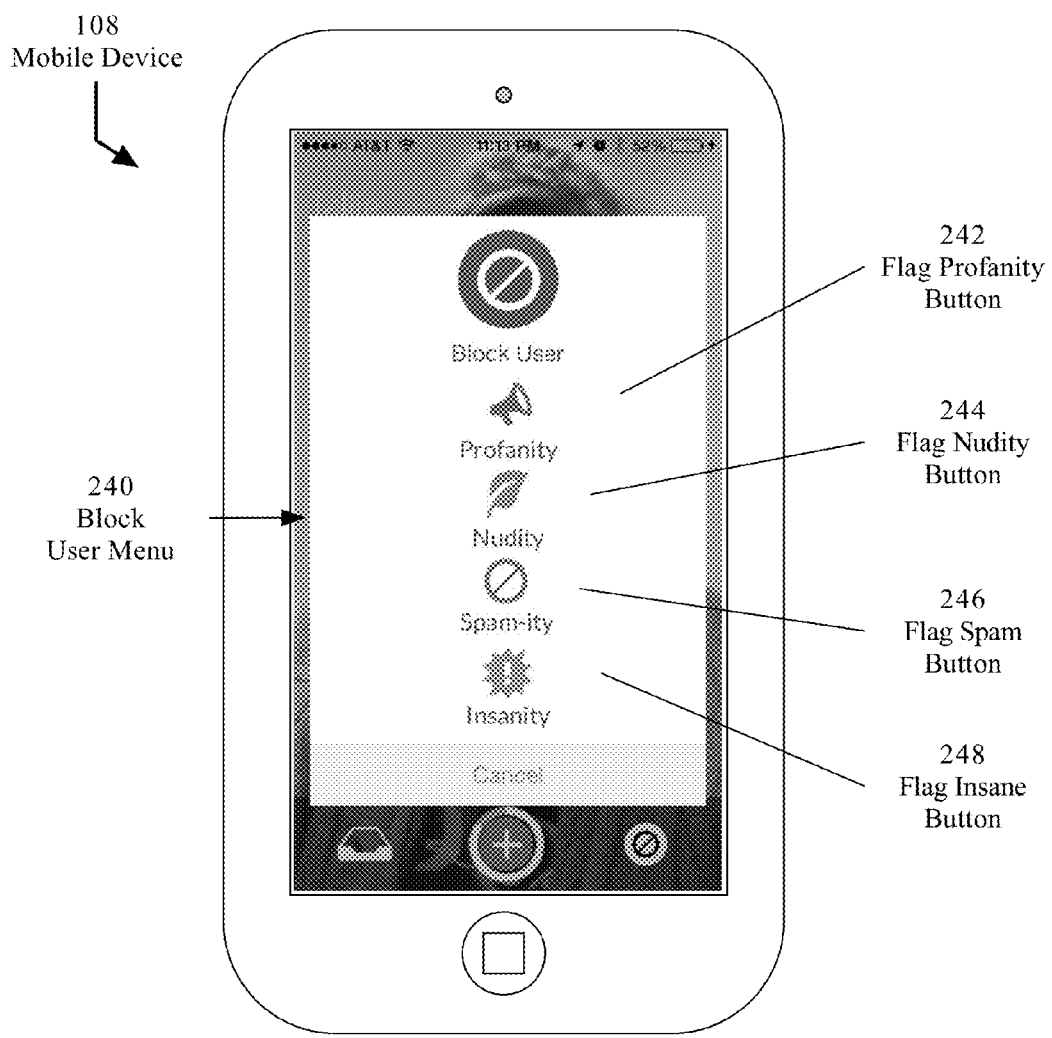
FIG. 2E is an example user interface for blocking a user based on their introduction video.

FIG. 2E is an example user interface for blocking a user from providing future videos to the primary user. In menu 240, the primary user may give specific reasons for blocking the target user including but not limited to spam 246, nudity 244, offensive language, profanity 242, insanity 248 or some combination thereof. These indications may be used as flags for other users or the system administrator for only allowing access to appropriate videos.

C. Response Videos

In some embodiments, all other interactions other than the introduction video are by one-to-one video communications. These one-to-one videos are referred to herein as "response videos." Response videos are between a target user and a primary user (or vice versa) and are created exclusively through the social interaction system. FIG. 3A is an example screenshot of saved videos that the primary user chose to respond to. In menu 302, the introduction videos of these target user(s) are saved for a later viewing 304 even after they are responded to. In other embodiments, a video may be removed or overwritten after it is responded to.

After viewing all or a portion of an introduction video, a primary user may desire to connect with a target user by responding to the target user's introduction video. In some embodiments, a user may respond to another user exclusively by recording a response video through the social interaction system. In other embodiments, a primary user is given a variety of options to respond to an introduction video. For example, the user may respond with an instant message, an email, a Facebook friend request, talking on the phone, a live stream video chat, or a combination of one or more response actions. FIG. 3B is an example screenshot of a menu 312 for choosing how to respond to a particular user based on their introduction video. Options are presented for responding through Facebook 314, email 316, phone 318, or simply by sending a response video 320.

In some embodiments, the primary user is required to at least respond with a response video through the social interaction system in addition to responding with additional response actions such as Facebook or telephone. The requirement of a response video may further ensure the authenticity of the primary user before the target user is contacted by other means. Response videos are created through a live video recording. The "live" in live video recording refers to live at the time of the recording, not necessarily at the time of the sending or viewing.

According to one embodiment, the social interaction system ensures that, if a video X is to be used as a response to a video Y, then video X must, at the time video X is captured, be designated as a response to video Y. In other words, even when created by the software of the social interaction system, videos initially captured for other purposes (e.g. to respond to a video Z) cannot be used as a response to video Y. Any video response to video Y has to be captured (a) after video Y has been received, and (b) explicitly as a response to video Y.

Figure 3D:
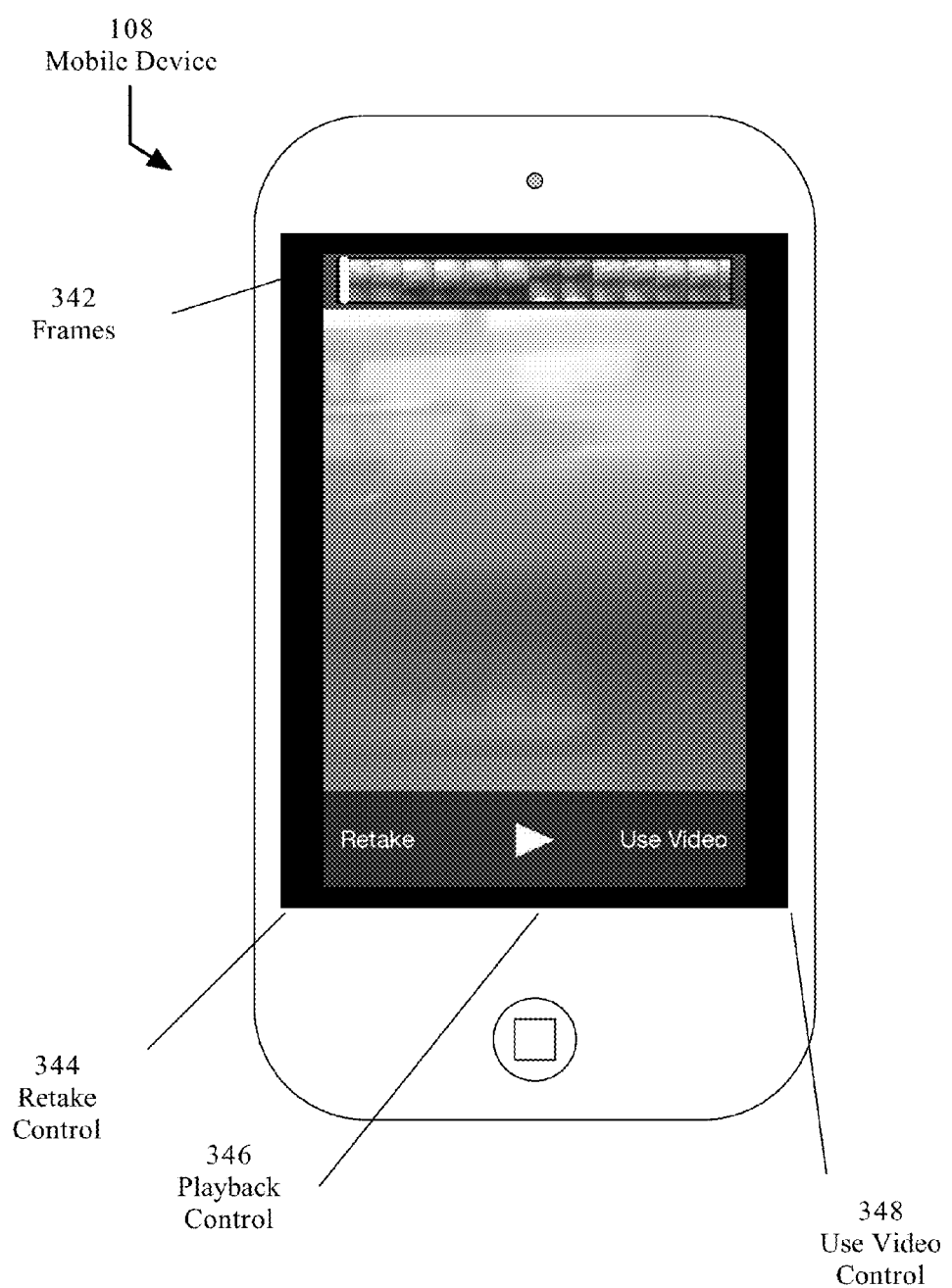
FIG. 3D is an example screenshot for accepting a natively created response video with the social interaction system.

FIG. 3C is an example screenshot after the user has selected the "just video" option. The example screenshot is of the primary user starting the video recording. A button 334 at the bottom allows a user to stop recording. Similar to the introduction video, the touch screen interface provides a timer 330 for recording the length of the video. According to one embodiment, the video may be limited to a certain amount of time. There are also options to pause the recording and restart the recording. FIG. 3D is an example screen-shot after recording the video. The primary user is given the option to send the recorded video or save it for later. After a user stops recording, the frames 342 of the video are across the top of the screen. A user is given the option to retake 344, play the video back 346, or use the video 348.

In some embodiments, a user interface for other electronic message responses also includes authenticated forms of communication using direct access to hardware components such as a microphone or camera. In some embodiments, the social interaction system automatically fills in to and from data for the primary user and target user. In some embodiments, the social interaction system provides its own client (including a proxy electronic notification address) to provide an electronic message. This client may be configured to prevent bots from spamming users and prevent users from being required to give their personal email addresses.

D. Receiving Incoming Messages

Figure 4A:
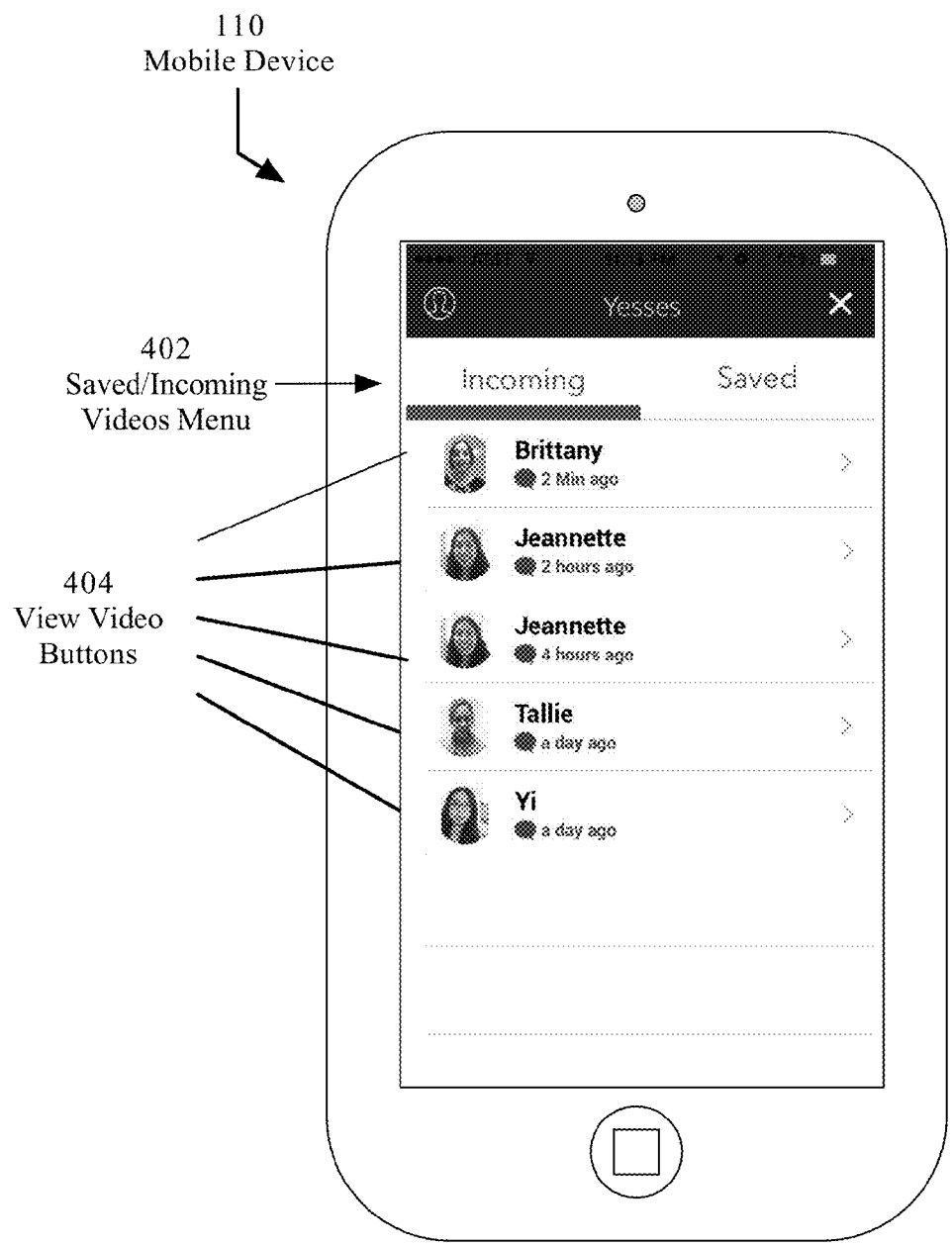
FIG. 4A is a block diagram of a user interface for receiving incoming response videos.

In some embodiments, incoming messages are in the form of a video recorded through the social interaction software. FIG. 4A is a screenshot of a user interface for receiving incoming response videos. In menu 402, an indication of the incoming message may include a thumbnail of the incoming video, a thumbnail of a user's introduction video, a user name, and a short message indicating how long the incoming message has been pending. One or more of these elements may be configured as buttons 404 to view the corresponding video. An additional visual representation may be used to indicate the primary user has viewed a particular incoming message. Another visual representation may be used to indicate the primary user has responded to the incoming message. In some embodiments, the order of the incoming messages depends on the time in which the messages were received. The most recent incoming videos are displayed at the top with less recent videos being displayed progressively lower. In other embodiments, incoming messages may be organized in categories or based on whether they have been viewed.

Figure 4B:
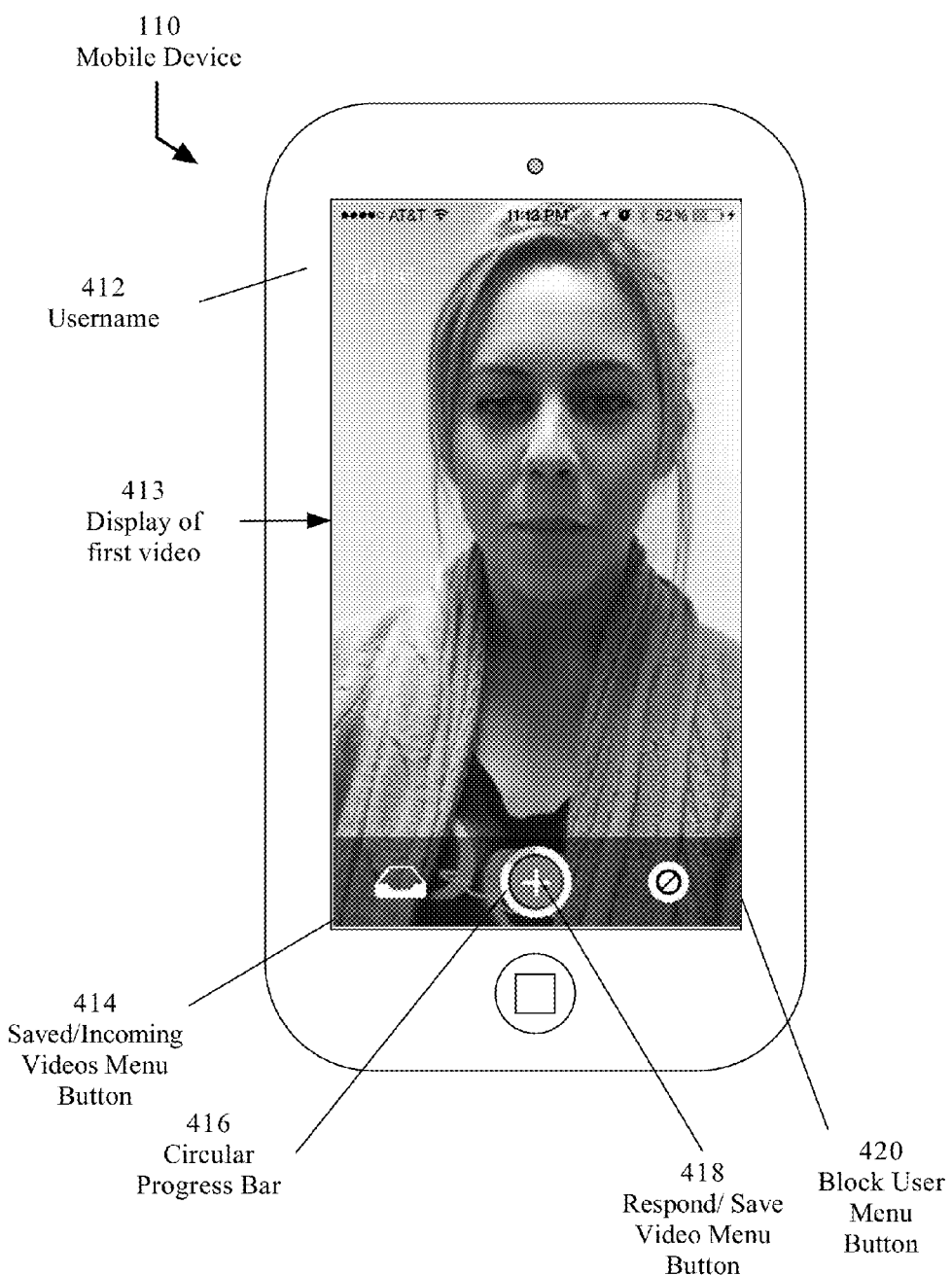
FIG. 4B is a block diagram of a user interface for viewing response videos.

FIG. 4B is a screenshot of a user interface for viewing incoming response videos. Viewing an incoming message is similar to viewing an introduction video. The same or similar user interface options may be presented to the user as when viewing the introduction video. For example, the user interface may include 1) a user name 412 in the top left corner; 2) a button 414 in the bottom left corner to display a menu of incoming videos and saved videos; 3) a circular progress bar 416 counting down the length of the video; 4) a button 418 in the bottom center to respond to or save the current video; 5) a button 420 at the bottom right to display a menu for blocking the target user.

The content of a response video is likely directed specifically toward a particular user. Thus, the video feed can be used by the primary user to gauge a target user's actual level of interest. The content of the video likely contains responses to particular conversations or questions presented to the user in previous response messages or even in the introduction video. These videos are all recorded using the social interaction software, so misrepresentation regarding the target user's actual identity is minimized.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
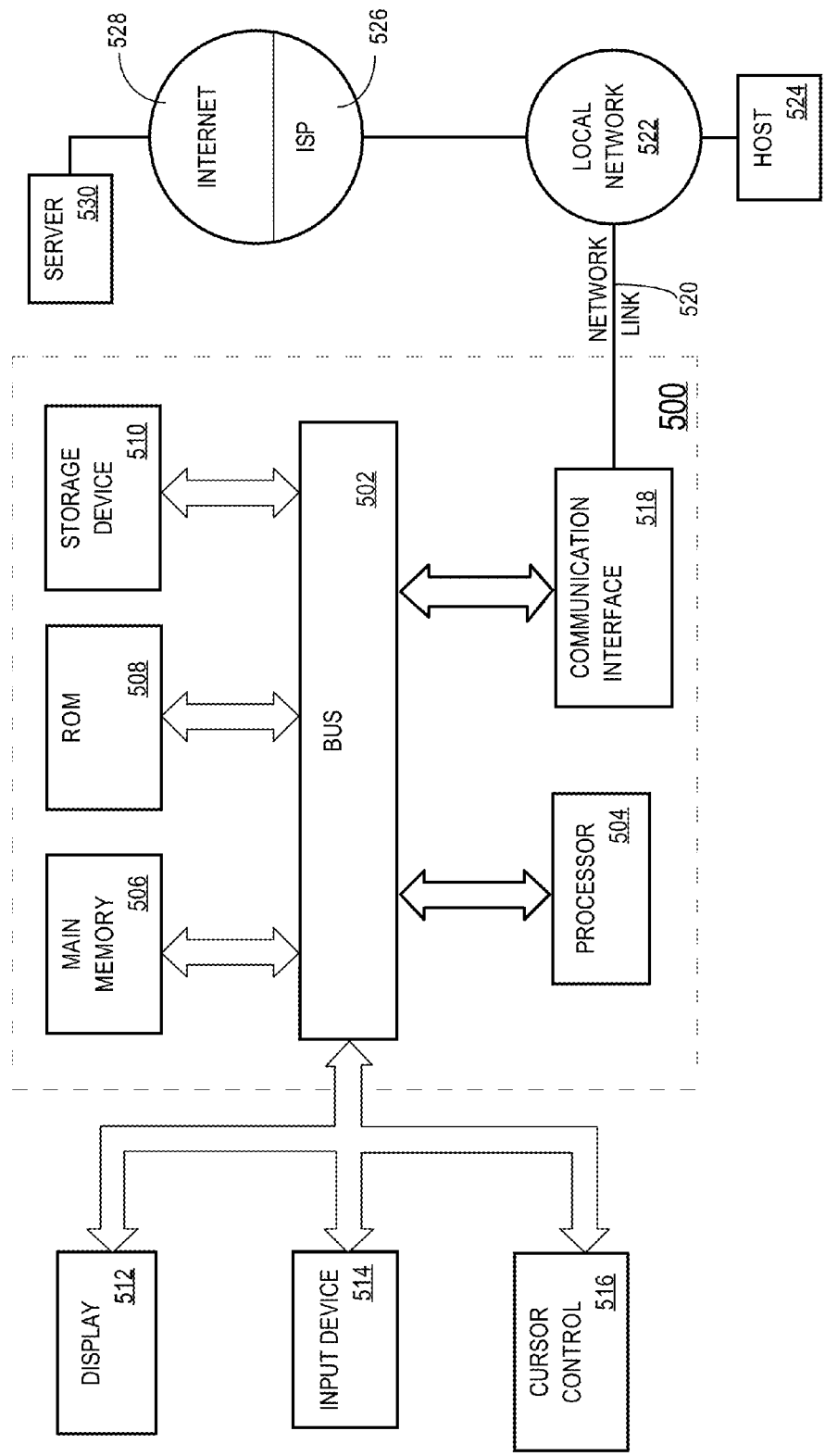
FIG. 5 is a block diagram illustrating a computer system that may be used to implement the techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   executing an instance of a social interaction program at a primary user device that is operatively coupled to hardware for capturing video;
   displaying, by the instance of the social interaction program, particular content that relates to another user of the social interaction program;
   providing one or more controls, within the instance of the social interaction program, to respond to the particular content;
   wherein at least one of the one or more controls allows video responses to the particular content;
   wherein every control, of the one or more controls, that allows video responses to the particular content, only allows live video recording responses that are captured
   (a) as responses to the particular content,
   (b) by the instance of the social interaction program,
   (c) using hardware operatively coupled to the primary user device;
   after the particular content has been received by the primary user device, receiving input that activates a particular control to create a live video recording response to the particular content;
   in response to the input, the instance of the social interaction program causing hardware operatively coupled to the primary user device to capture a particular live video recording;
   encrypting the particular live video recording and sending the particular live video recording to a server device over a wireless network connection to another instance of the social interaction program for decryption, wherein the server device authenticates that the particular live video recording was created through the social interaction program based on the encrypting; and
   the instance of the social interaction program causing the particular live video recording to be sent over a network to the other instance of the social interaction program used by the other user.

2. The method of claim 1, wherein the method further comprises:
   in response to receiving an indication of a request to communicate with the other user of the other instance of the social interaction program, providing an interface for an electronic message;
   wherein the particular live video recording is sent in conjunction with the electronic message.

3. The method of claim 1, wherein the other instance of the social interaction program decrypts the particular live video recording after receiving authentication data corresponding to the other user of the other instance of the social interaction program.

4. The method of claim 1, wherein responding to the particular content is limited to a number of times per day, per week, per month, or per account.

5. The method of claim 4, wherein the number of times is one.

6. The method of claim 1, wherein the method further comprises:
   prior to displaying the particular content, receiving a selection of a social interaction type;
   wherein the particular content is displayed based on the social interaction type selected.

7. The method of claim 1, further comprising when the server device cannot authenticate that the particular live video recording was created through the social interaction program based on the encryption, the server device blocking the particular live video recording from being downloaded.

8. A method comprising:
   executing an instance of a social interaction program at a primary user device that is operatively coupled to hardware for capturing video;
   displaying, by the instance of the social interaction program, particular content that relates to another user of the social interaction program;
   providing one or more controls, within the instance of the social interaction program, to respond to the particular content;
   wherein at least one of the one or more controls allows video responses to the particular content;
   wherein every control, of the one or more controls, that allows video responses to the particular content, only allows live video recording responses that are captured
   (a) as responses to the particular content,
   (b) by the instance of the social interaction program,
   (c) using hardware operatively coupled to the primary user device;
   after the particular content has been received by the primary user device, receiving input that activates a particular control to create a live video recording response to the particular content;
   in response to the input, the instance of the social interaction program causing hardware operatively coupled to the primary user device to capture a particular live video recording; and
   encoding the particular live video recording with metadata that enables a server device to authenticate that the particular live video recording was created through the social interaction program.

9. The method of claim 8, wherein the metadata identifies a time in which the particular live video recording was created.

10. The method of claim 8, further comprising, when the server device cannot authenticate that the particular live video recording was created through the social interaction program based on the metadata, the server device blocking the particular live video recording from being downloaded.

11. One or more non-transitory storage media storing instructions which, when executed by one or more computing devices, cause performance of a method comprising the steps of:
    executing an instance of a social interaction program at a primary user device that is operatively coupled to hardware for capturing video;

displaying, by the instance of the social interaction program, particular content that relates to another user of the social interaction program;

providing one or more controls, within the instance of the social interaction program, to respond to the particular content;

wherein at least one of the one or more controls allows video responses to the particular content;

wherein every control, of the one or more controls, that allows video responses to the particular content, only allows live video recording responses that are captured
(a) as responses to the particular content,
(b) by the instance of the social interaction program,
(c) using hardware operatively coupled to the primary user device;

after the particular content has been received by the primary user device, receiving input that activates a particular control to create a live video recording response to the particular content;

in response to the input, the instance of the social interaction program causing hardware operatively coupled to the primary user device to capture a particular live video recording;

encrypting the particular live video recording and sending the particular live video recording to a server device over a wireless network connection to another instance of the social interaction program for decryption, wherein the server device authenticates that the particular live video recording was created through the social interaction program based on the encrypting; and the instance of the social interaction program causing the particular live video recording to be sent over a network to the other instance of the social interaction program used by the other user.

12. The one or more non-transitory media of claim 11, wherein the steps further cause performance of encrypting the particular live video recording and sending the particular live video recording to a server device over a wireless network connection to provide to the other instance of the social interaction program for decryption.

13. The one or more non-transitory media of claim 12, wherein the steps further cause performance of:

in response to receiving an indication of a request to communicate with the other user of the other instance of the social interaction program, providing an interface for an electronic message;

wherein the particular live video recording is sent in conjunction with the electronic message.

14. The one or more non-transitory media of claim 12, wherein the encrypting enables the server device to authenticate that the particular live video recording was created through the social interaction program.

15. The one or more non-transitory media of claim 14, wherein the encrypting enables the other instance of the social interaction program to decrypt after receiving authentication data corresponding to the other user of the other instance of the social interaction program.

16. The one or more non-transitory media of claim 11, further comprising encoding the particular live video recording with metadata that enables a server device to authenticate that the particular live video recording was created through the social interaction program.

17. The one or more non-transitory storage media of claim 11, the steps further comprising, when the server device cannot authenticate that the particular live video recording was created through the social interaction program based on the encrypting, the server device blocking the particular live video recording from being downloaded.

18. A method comprising:

executing an instance of a social interaction program at a primary user device that is operatively coupled to hardware for capturing video;

wherein hardware for capturing video includes a camera and a microphone mounted within a housing of the primary user device;

displaying, by the instance of the social interaction program, a plurality of introduction videos that relate to other users of the social interaction program;

providing one or more controls, within the instance of the social interaction program, to respond to a particular introduction video of the plurality of introduction videos;

wherein at least one of the one or more controls allows video responses to the particular introduction video;

wherein every control, of the one or more controls, that allows video responses to the particular introduction video, only allows live video recording responses that are captured, after displaying the particular introduction video, by the instance of the social interaction program using hardware operatively coupled to the primary user device;

after displaying the particular introduction video, receiving input that activates a particular control to create a live video recording response to the particular introduction video;

in response to the input, the instance of the social interaction program causing hardware operatively coupled to the primary user device to capture a particular live video recording; and the instance of the social interaction program causing the particular live video recording to be sent over a network to another instance of the social interaction program used by the other user, wherein responding to the particular introduction video is limited to a number of times per day, per week, per month, or per account.

19. The method of claim 18, wherein the number of times is one.

20. The method of claim 18, further comprising encrypting the particular live video recording and sending the particular live video recording to a server device over a wireless network connection to another instance of the social interaction program for decryption, wherein the server device authenticates that the particular live video recording was created through the social interaction program based on the encrypting.

* * * * *